(12) United States Patent
Miyazawa (10) Patent No.: US 8,639,768 B2
(45) Date of Patent: Jan. 28, 2014

(54) MULTI-FUNCTIONAL DEVICE EXECUTING MULTIPLE FUNCTIONS AND FUNCTION MANAGEMENT

(75) Inventor: Masafumi Miyazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 218 days.

(21) Appl. No.: 12/908,594

(22) Filed: Oct. 20, 2010

(65) Prior Publication Data

US 2011/0093556 A1    Apr. 21, 2011

(30) Foreign Application Priority Data

Oct. 20, 2009  (JP) ................................. 2009-241207

(51) Int. Cl.
*G06F 15/16* (2006.01)

(52) U.S. Cl.
USPC .............................. 709/208; 709/217; 709/218

(58) Field of Classification Search
USPC .......................................... 709/208, 217, 218
See application file for complete search history.

(56) References Cited

U.S. PATENT DOCUMENTS

| | | | | |
|---|---|---|---|---|
| 6,026,258 | A * | 2/2000 | Fresk et al. ..................... | 399/87 |
| 6,246,487 | B1 * | 6/2001 | Kobayashi et al. ........... | 358/1.13 |
| 2001/0017708 | A1 * | 8/2001 | Kobayashi et al. ........... | 358/1.13 |
| 2006/0026434 | A1 | 2/2006 | Yoshida et al. | |
| 2006/0075150 | A1 * | 4/2006 | Hwang et al. .................... | 710/14 |
| 2006/0082827 | A1 * | 4/2006 | Lee et al. ....................... | 358/1.15 |
| 2007/0136787 | A1 * | 6/2007 | Chen et al. ......................... | 726/3 |
| 2009/0279121 | A1 * | 11/2009 | Bostick et al. ............... | 358/1.15 |

FOREIGN PATENT DOCUMENTS

| | | |
|---|---|---|
| JP | 2003-067336 A | 3/2003 |
| JP | 2003-229978 A | 8/2003 |

OTHER PUBLICATIONS

European Patent Office, extended European Search Report for European Patent Application No. 10251823.0 (counterpart European patent application), dated Nov. 21, 2012.

* cited by examiner

*Primary Examiner* — Mohamed Wasel
(74) *Attorney, Agent, or Firm* — Baker Botts L.L.P.

(57) ABSTRACT

A multi-functional device communicatably connected to a plurality of servers, each server corresponding to one of a plurality of functions, is provided. The multi-functional device includes, a function execution unit that executes one of the plurality of functions, a first transmission unit that transmits a first signal including the obtained user identification information based on location information of the server, and a first reception unit that receives a function execution instruction which is transmitted from the server in response to the first signal, wherein the function execution instruction includes limitation information, which corresponds to the user and which limits execution of the desired function, wherein the function execution unit suspends the execution of the desired function when location information of the server is specified, and wherein when the function execution instruction is received, the function execution unit resumes execution of the desired function according to the limitation information.

15 Claims, 8 Drawing Sheets

28: FUNCTIONAL MANAGEMENT TABLE

| FUNCTIONAL INFORMATION 110 | URL 112 | POLLING NECESSITY INFORMATION 114 |
|---|---|---|
| COPY | http://xxxx.com/copy | NO |
| FAX TRANSMISSION | http://yyyy.com/fax | NO |
| PC PRINT | http://zzzz.com/print | YES |
| USB DIRECT PRINT | NONE | — |
| MEMORY RECEPTION FAX PRINT | NONE | — |

MULTI-FUNCTIONAL DEVICE EXECUTING MULTIPLE FUNCTIONS AND FUNCTION MANAGEMENT

CROSS-REFERENCE TO RELATED APPLICATIONS

This application claims priority from Japanese Patent Application No. 2009-241207 filed on Oct. 20, 2009, the entire contents of which are incorporated herein by reference.

TECHNICAL FIELD

Aspects of the present invention relate to a multi-functional device executing a plurality of functions.

BACKGROUND

There has been proposed a related-art multi-functional device executing a plurality of functions. The related-art multi-functional device stores information indicating a function (for example, copy) that can be utilized by a user and limitation information for limiting the execution of the function (for example, maximum allowable number of copies). When the user desires to execute a specific function, the related-art multi-functional device determines whether the specific function is a function that can be utilized by the user. When determined affirmatively, the specific function is executed according to the limitation information.

As described above, in related-art, only the related-art multi-functional device is used to limit the function execution for each user.

SUMMARY

However, in order to limit the function execution for each user, other models may be preferred to be applied. Accordingly, exemplary embodiments of the present invention provide other models to limit the function execution for each user.

According to an exemplary embodiment of the present invention, there is provided a multi-functional device communicatably connected to a plurality of servers, each server corresponding to one of a plurality of functions, comprising: a function execution unit that executes one of the plurality of functions, a storage unit that stores, for each of the plurality of functions, function identification information indicative of the function and location information of the server corresponding to the function, such that the function identification information and the location information of the server are linked with each other, a first obtaining unit that obtains user identification information indicative of a user, a second obtaining unit that obtains the function identification information indicative of a desired function to be executed, when the user carries out an operation to request the desired function to be executed, a specifying unit that specifies the location information of the server linked with the function identification information obtained from the storage unit, a first transmission unit that transmits a first signal including the obtained user identification information based on the location information of the server; and a first reception unit that receives a function execution instruction, which is transmitted from the server in response to the first signal including the obtained user identification information, wherein the function execution instruction includes limitation information, which corresponds to the user and which limits execution of the desired function, wherein the function execution unit suspends the execution of the desired function when the location information of the server is specified, and wherein when the function execution instruction is received, the function execution unit resumes execution of the desired function, which was suspended according to the limitation information included in the function execution instruction.

A control method and a computer program for realizing the multi-functional device are also newly provided. Additionally, a system including the multi-functional device and the plurality of servers is also newly provided.

DETAILED DESCRIPTION OF EXEMPLARY EMBODIMENTS

System Configuration

Figure 1:
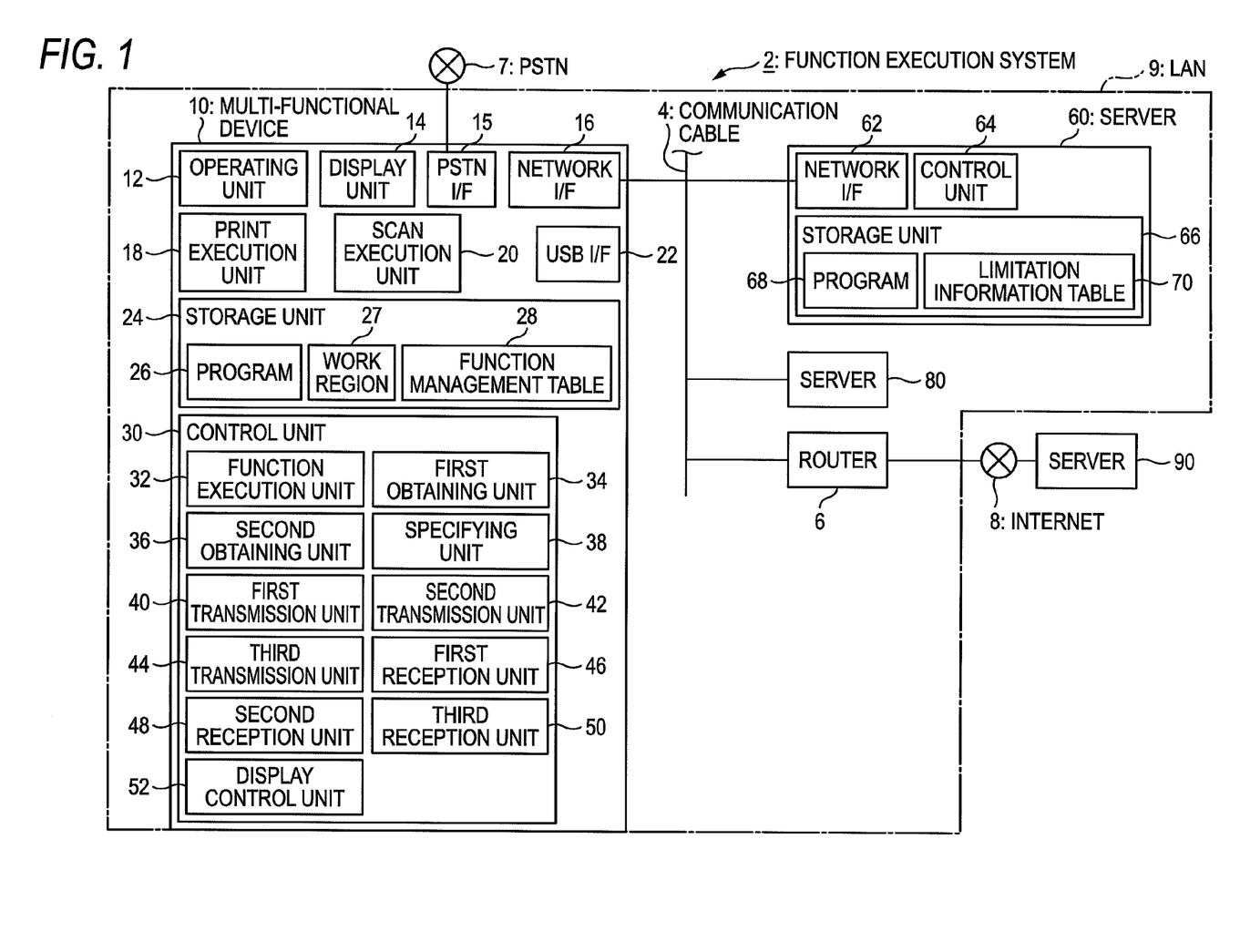
FIG. 1 shows an example of a configuration of a function execution system.

An exemplary embodiment of the present invention is described with reference to the drawings. FIG. 1 shows a schematic view of a function execution system 2 of the present embodiment. The function execution system 2 includes a communication cable 4, a router 6, a PSTN (Public Switched Telephone Networks) 7, an internet 8, a multi-functional device 10 and a plurality of servers 60, 80 and 90. The router 6, the multi-functional device 10 and the servers 60 and 80 are connected to the communication cable 4. The router 6 is connected to the internet 8. A range shown by dashed lines in FIG. 1 provides a local area network (hereinafter called LAN) 9. That is, when the internet 8 is located upstream, LAN 9 is configured by the devices 4, 6, 10, 60 and 80 that are located downstream. The multi-functional device 10 and the servers 60 and 80 can communicate with each other via the communication cable 4. The server 90 is located outside the LAN 9 and connected to the internet 8. The multi-functional device 10 and the server 90 can communicate with each other via the communication cable 4, the router 6 and the internet 8.

(Configuration of Multi-Functional Device 10)

The configuration of the multi-functional device 10 is described below. The multi-functional device 10 has a plurality of functions, such as a copy function, a FAX function, a printer function, a scanner function, an E-mail transmission function and an internet FAX function, etc. The multi-functional device 10 includes an operating unit 12, a display unit 14, a PSTN interface 15, a network interface 16, a print execution unit 18, a scan execution unit 20, a USB interface 22, a storage unit 24 and a control unit 30. The operating unit 12 includes a plurality of keys. A user can enter various instructions into the multi-functional device 10 by operating the operating unit 12. The display unit 14 can display various information. The PSTN interface 15 is connected to the PSTN 7. The network interface 16 is connected to the communication cable 4. The print execution unit 18 includes a print mechanism of an inject head style or a laser style, and executes printing according to instructions from the control unit 30. The scan execution unit 20 includes a scanning mechanism of CIS and CCD, and produces image data by scanning an object. The USB interface 22 is connected to a USB cable, a USB memory, etc.

The storage unit 24 stores a program 26 and a functional management table 28. The control unit 30 executes a process according to the program 26 of the storage unit 24. By executing the process, functions of the units 32-52 are realized respectively. The storage unit 24 includes a work region 27 for temporarily storing a user ID.

Figure 2:
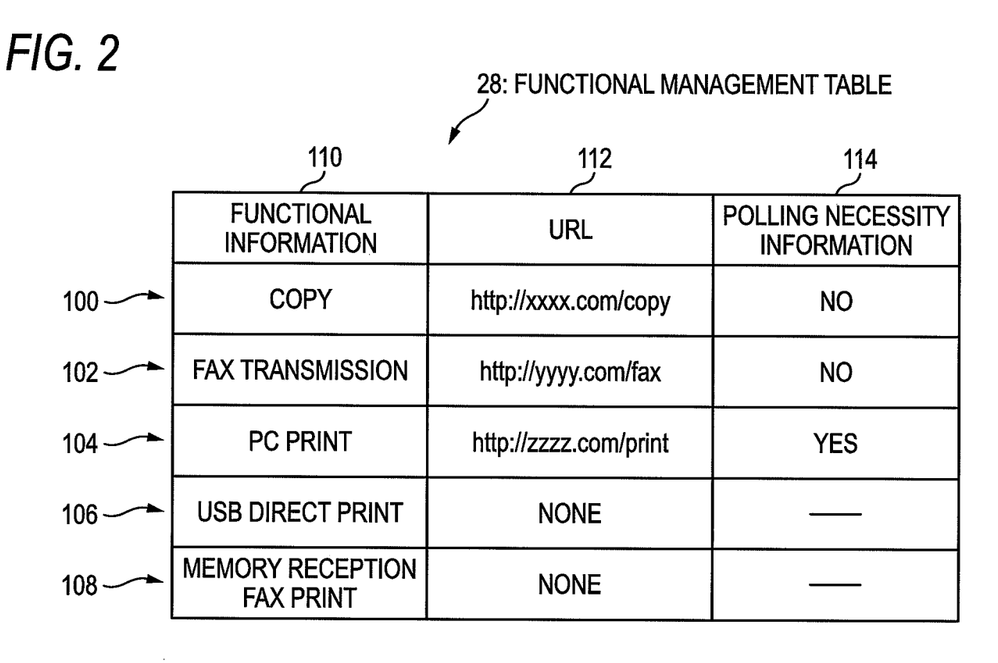
FIG. 2 shows an example of a function management table.

The function management table 28 is described below. FIG. 2 shows the configuration of the functional management table 28. The functional management table 28 includes a plurality of combination information 100-108. Each of the combination information 100-108 is linked with functional information 110, a URL 112 and polling necessity information 114. The functional information 110 is the identification information identifying the plurality of functions which can be executed by the multi-functional device 10. The plurality of functions shown in FIG. 2 are described briefly. "Copy" is a function to print scan data produced by the multi-functional device 10. "FAX transmission" is a function to transmit the scan data produced by the multi-functional device 10 to an external device via the PSTN 7. "PC print" is a function to print data transmitted from a PC which is inside the LAN 9 but not shown in the figure. "USB direct print" is a function to print data in the USB memory which is connected to the USB interface 22. "Memory reception FAX print" is a function to accumulate data from the PSTN 7 in the storage unit 24, and print the data according to a user's instructions. The URL 112 is the location information of the servers corresponding to the functions shown by the above functional information 110. The polling necessity information 114 indicates whether polling is necessary for the server. The polling necessity information "YES" indicates that polling is necessary, while the polling necessity information "NO" indicates that polling is not necessary.

The URL 112 "http://xxxx.com/copy" in the combination information 100 is the location information of the server 60 of FIG. 1. The URL 112 "http://yyyy.com/fax" in the combination information 102 is the location information of the server 80 of FIG. 1. The URL 112 "http://zzzz.co.jp/print" in the combination information 104 is the location information of the server 90 of FIG. 1. The URL 112 of the server is not written into the combination information 106 and 108. The polling necessity information 114 is also not written into the combination information 106 and 108.

Previously, the functional management table 28, which includes various functional information such as "copy" and "FAX transmission" in the column of the functional information 110, is stored in the storage unit 24 of the multi-functional device 10. For example, an administrator of the function execution system 2 enters the URL of the servers 60 and 80 (which correspond to the functions such as "copy" and "FAX transmission", respectively) and the polling necessity information into the multi-functional device 10 by operating the operating unit 12 of the multi-functional device 10. Thus, the multi-functional device 10 has the URL and the polling necessity information written into the functional management table 28. Thereby, the functional management table 28 shown in FIG. 2 is completed. The administrator enters the polling necessity information "NO" with regard to the servers 60 and 80 located inside the LAN 9, and enters the polling necessity information "YES" with regard to the server 90 located outside the LAN 9.

(Configuration of Server 60)

The configuration of the server 60 is described below. As mentioned above, the server 60 corresponds to the copy function of the multi-functional device 10. The server 60 includes a network interface 62, a control unit 64 and a storage unit 66. The network interface 62 is connected to the communication cable 4. The control unit 64 executes a process according to a program 68 stored in the storage unit 66.

Figure 3:
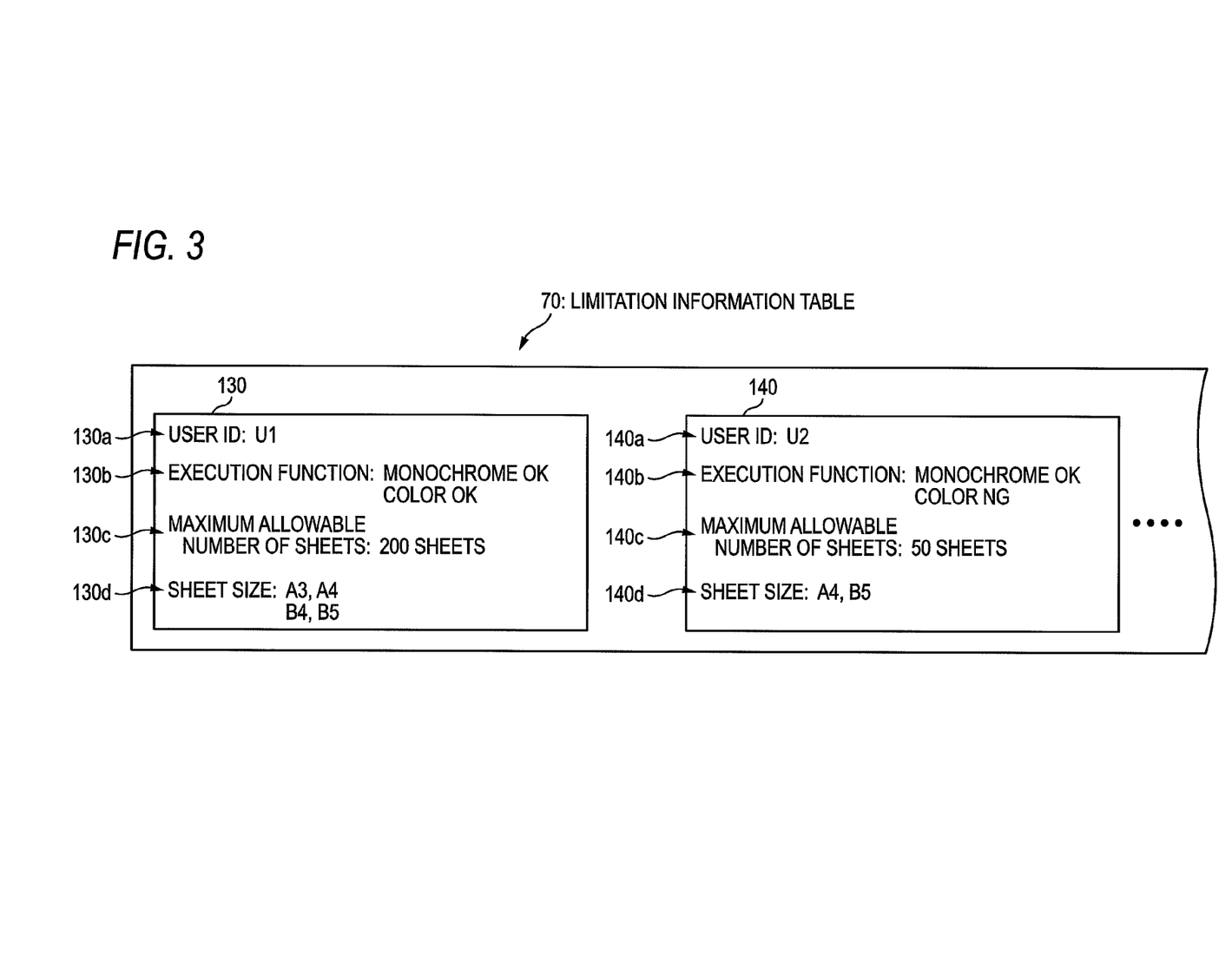
FIG. 3 shows an example of a limitation information table.

The storage unit 66 stores a limitation information table 70. FIG. 3 shows an example of the limitation information table 70. The limitation information table 70 includes limitation information 130 and 140 for a plurality of users. Each limitation information respectively limits the execution of the copy function for each user. The limitation information 130 includes a user ID 130$a$, an execution function 130$b$, a maximum allowable number of sheets 130$c$ and a sheet size 130$d$, while the limitation information 140 includes a user ID 140$a$, an execution function 140$b$, a maximum allowable number of sheets 140$c$ and a sheet size 140$d$. The user IDs 130$a$ and 140$a$ are identification information that identify a plurality of users utilizing the multi-functional device 10. The execution functions 130$b$ and 140$b$ are information indicating the functions allowed for the user. Here, "Monochrome OK" in the execution functions 130$b$ and 140$b$ means that a monochrome copy is allowed. "Color OK" in the execution function 130$b$ means that a color copy is allowed. Meanwhile, "Color NG" in the execution function 140$b$ means the color copy is not allowed (i.e. forbidden). The maximum allowable numbers of sheets 130$c$ and 140$c$ are information indicating the maximum copy number allowed for the user. The sheet sizes 130$d$ and 140$d$ are information indicating the copy sheet size allowed for the user.

For example, the administrator of the function execution system 2 enters user IDs, execution functions, maximum allowable numbers of sheets and sheet sizes into the server 60 by operating the operating unit of the server 60 (not shown in the figure). The server 60 has the limitation information including all the input information written into the limitation information table 70. Thereby, the limitation information table 70 illustrated in FIG. 3 is completed.

(Configurations of Servers 80 and 90)

The configurations of the servers 80 and 90 are similar to the above server 60. As mentioned above, the server 80 corresponds to the FAX transmission function of the multi-functional device 10. The server 90 corresponds to the PC print function of the multi-functional device 10. The servers 80 and 90 also include a limitation information table similar to the limitation information table 70 of the server 60. However, the limitation information table of the server 80 includes information to limit the execution of the FAX transmission function. For example, the limitation information in the limitation information table of the server 80 includes a user ID, an execution function (OK or NG of monochrome FAX transmission and OK or NG of color FAX transmission) and a maximum allowable number of FAX transmissions. In addition, the limitation information table of the server 90 includes information to limit the execution of the PC print function. For example, the limitation information in the limitation information table of the server 90 includes a user ID, an execution function (OK or NG of monochrome print and OK or NG of color print) and a maximum allowable print number.

(Processes Executed by the Multi-Functional Device 10 and the Server 60)

Next, processes executed by the multi-functional device 10 and the server 60 will be described with reference to FIG. 4. A user enters his/her user ID by operating the operating unit 12 of the multi-functional device 10 (see Symbol 200, user ID input operation). The display unit 14 of the multi-functional device 10 displays the plurality of functions that can be executed by the multi-functional device 10. The user enters the functional information, which indicates the copy function desired by the user among the plurality of functions displayed in the display unit 14, into the multi-functional device 10 by operating the operating unit 12 of the multi-functional device 10 (see Symbol 202, functional information input operation). Next, the user enters content information indicating concrete content of the copy function (color copy or monochrome copy, copy number and sheet size) by operating the operating unit 12 of the multi-functional device 10 (see Symbol 204, content information input operation).

Next, the multi-functional device 10 generates a session ID (S2). The session ID is a unique ID containing current time. Next, the multi-functional device 10 specifies the URL which is obtained from the functional management table 28 (see FIG. 2) and linked with the copy function selected by a functional information input operation 202 (S4). Specifically, the multi-functional device 10 specifies the URL 112 "http://xxxx.com/copy" of the server 60 which is obtained from the functional management table 28 and corresponds to the copy function. Next, the multi-functional device 10 specifies the polling necessity information 114, which is linked with the URL 112 specified in S4 and obtained from the functional management table 28, to determine whether a polling signal is necessary (S5). In the example of FIG. 4, the multi-functional device 10 determines that the polling necessity information 114 linked with the URL 112 specified in S4 is "NO". Therefore, the multi-functional device 10 does not transmit the polling signal to the server 60 when the communication session is established between the multi-functional device 10 and the server 60. Next, the multi-functional device 10 suspends the execution of the copy function (S6).

The multi-functional device 10 transmits a function execution request 208, which includes a session ID 210 generated in S2 and a user input ID 212 input by a user in the user ID input operation 200, to the URL 112 specified in S4 (that is the server 60). A communication session is established between the multi-functional device 10 and the server 60 after the multi-functional device 10 transmitted the function execution request 208 including the session ID 210. After that all communication can be performed via HTTP.

The server 60 specifies from the limitation information table 70 (see FIG. 3) the limitation information which includes the user ID 212 included in the function execution request 208 (S8). For example, when the user ID 212 included in the function execution request 208 is "U1", the server 60 specifies the limitation information 130 (see FIG. 3) including "U1". After that, the server 60 transmits a function execution instruction 214, which includes the session ID 210 and the limitation information 216 specified in S8, to the multi-functional device 10.

Next, the multi-functional device 10 resumes the copy function suspended in S6 according to various information of the limitation information 216. For example, when the content information input by the user "U1" in the content information input operation 204 includes an execution function "Color", allowable number "30" and sheet size "A4", and the limitation information 216 includes execution function "Monochrome OK, color OK", maximum allowable number "200" and sheet size "A3, A4, B4, B5" (see 130 of FIG. 3), the multi-functional device 10 determines that all content information input by user "U1" in the content information input operation 204 is allowed by the limitation information 216. In this case, the multi-functional device 10 uses 30 sheets of the sheet size A4 to execute color copy according to the content information input by the user "U1" in the content information input operation 204. Meanwhile, for example, when the content information input by the user "U2" in the content information input operation 204 includes execution function "color", allowable number "30" and sheet size "A4", and the limitation information 216 includes execution function "Monochrome OK, color NG", maximum allowable number "50" and sheet size "A4, B5" (see 140 of FIG. 3), the multi-functional device 10 determines that some of the content information input by the user "U2" in the content information input operation 204 is not allowed by the limitation information 216. In this case, the multi-functional device 10 changes the content information input by the user "U2" in the content information input operation 204 into the content information allowed by the limitation information 216. In the above example, the multi-functional device 10 can change the execution function "Color" of the content information into "Monochrome". The multi-functional device 10 uses sheet size 30 sheets of the sheet size A4 to execute monochrome copy according to the changed content information. Further, in order to execute the copy function, the multi-functional device 10 stores the scan data generated by S12 in association with the session ID 210 in the work region 27 of the storage unit 24.

After transmitting the function execution instruction 214, the server 60 transmits a data transmission instruction 218, which includes the session ID 210 and URL 219 indicating a given folder in the server 60, to the multi-functional device 10. The multi-functional device 10 transmits scan data 220, which is stored in the work region 27 in association with the session ID 210 in the data transmission instruction 218, to the URL 219 included in the data transmission instruction 218. That is, the multi-functional device 10 transmits the scan data 220 to the server 60. After transmitting the scan data 220, the multi-functional device 10 deletes the scan data 220 from the work region 27. In addition, after the copy function has been executed, the multi-functional device 10 transmits a completion notice 222, which includes the session ID 210, the user ID 212 and result information 224 indicating the execution content of the copy function actually executed in S12, to the server 60. For example, the result information 224 includes the information such as execution function "Monochrome", print number "30" and sheet size "A4". Further, even when the actually executed content is different from the content information input by the user in the content information input operation 204, the result information 224 contains the actually executed content of the copy function.

The server 60 executes a preset modification process according to the user ID 212 and the result information 224 included in the completion notice 222 (S14). Specifically, for example, the server 60 subtracts the print number in the result information 224 from the maximum allowable number in the limitation information (for example 130) corresponding to the user ID 212 in the limitation information table 70 (see FIG. 3).

Next, the server 60 transmits a termination notice 226 including the session ID 210 to the multi-functional device 10. As a result, the multi-functional device 10 executes a process (not shown in figures) to end the session established by the communication 206.

(Processes Executed by the Multi-Functional Device 10 and the Server 80)

Figure 4:
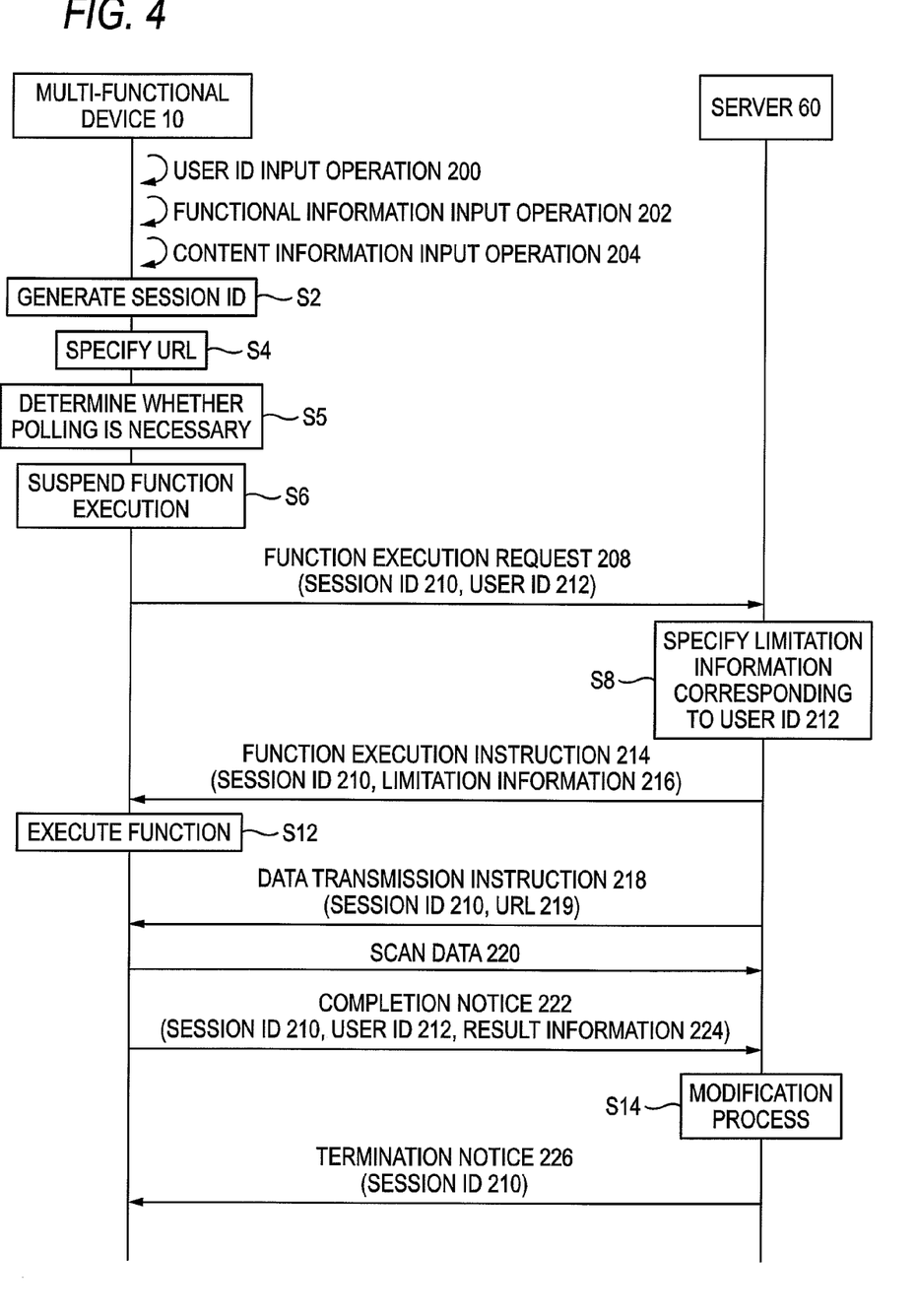
FIG. 4 shows an example of a process executed by a multi-functional device and a server.

The processes executed by the multi-functional device 10 and the server 80 are nearly the same as described in FIG. 4. The user inputs his/her user ID, the functional information indicating the FAX transmission function and the content information indicating the concrete content of the FAX transmission function (color FAX transmission or monochrome FAX transmission, FAX destination, sheet size), by operating the operating unit 12 of the multi-functional device 10. The multi-functional device 10 specifies the URL of the server 80 (S4), determines polling is not necessary (S5), and suspends the FAX transmission function (S6). Next, the multi-functional device 10 transmits a function execution request including the session ID and the user ID. In response, the server 80 transmits the function execution instruction including the limitation information that is linked with the user ID to the multi-functional device 10. The multi-functional device 10 executes the FAX transmission function according to the limitation information in the function execution instruction. Further, the multi-functional device 10 transmits the scan data to the data storage server (for example, server 80) according to the data transmission instruction from the server 80.

(Processes Executed by the Multi-Functional Device 10 and the Server 90)

Figure 5:
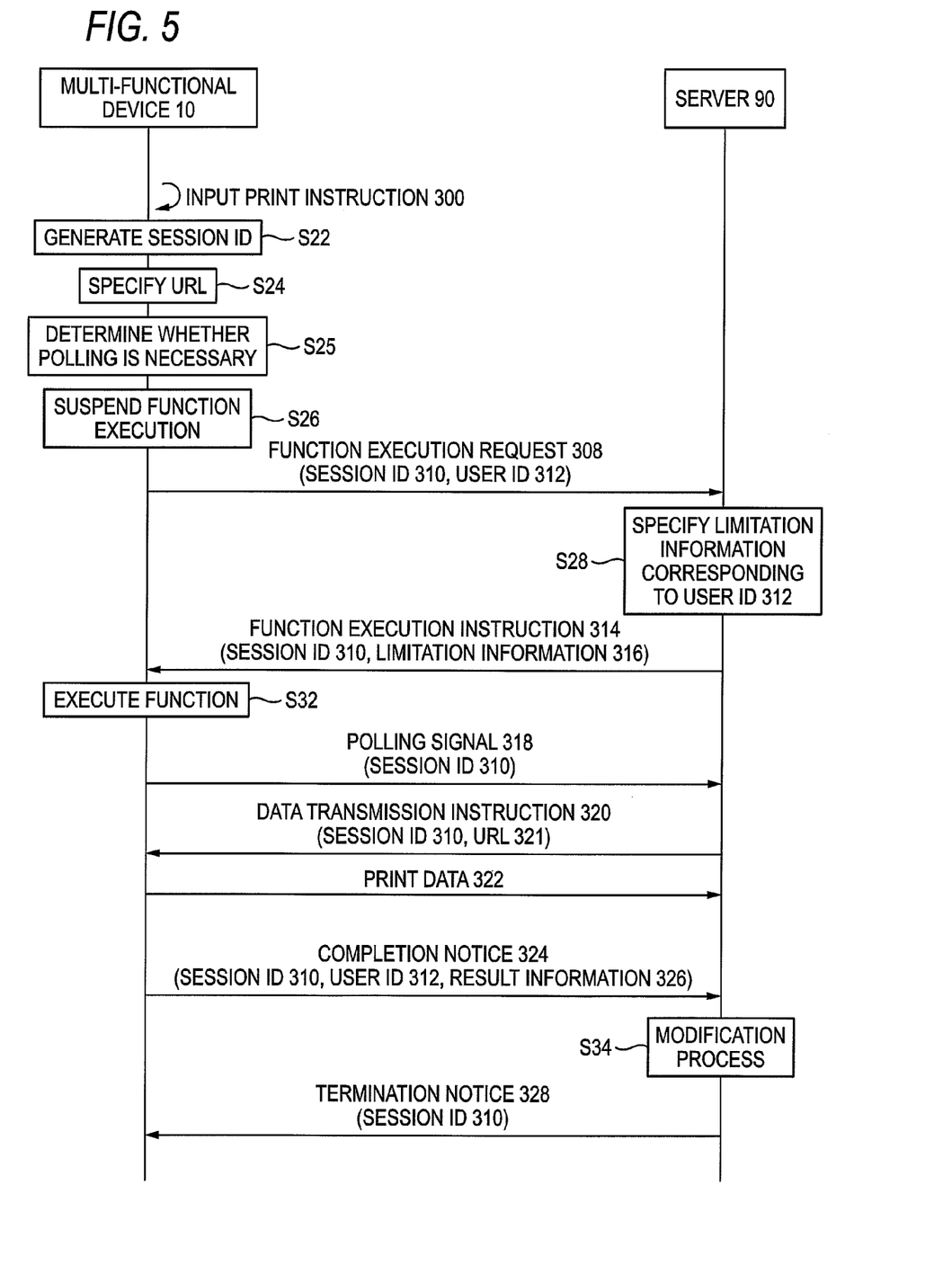
FIG. 5 shows another example of a process executed by a multi-functional device and a server.

Next, processes executed by the multi-functional device 10 and the server 90 will be described with reference to FIG. 5. However, the process executed by the multi-functional device 10 and the server 9 described in FIG. 5 is similar to that described in FIG. 4. Differences between the two processes will be mainly described below.

The user inputs his/her user ID, the functional information indicating the PC print function desired by the user and the content information indicating the concrete content of the PC print function (specification of the data that should be printed (hereinafter called print data), color print or monochrome print, print number and sheet size) into the external device by operating the operating unit of the external device (not shown in figures) such as PC which is connected to the communication cable 4. In this case, the external device transmits the user ID, the functional information, the content information and the print instruction including the print data to the multi-functional device 10. The print instruction is input into the multi-functional device 10 (see Symbol 300).

The process of S22-S26 is similar to the process of S2-S6 of FIG. 4, except that the multi-functional device 10 determines that the polling necessity information 114 corresponding to the URL 112 of the server 90 is "YES" in S25. Next, the multi-functional device 10 transmits a function execution request 308 including a session ID 310 and a user ID 312 to the server 90. The communication session is established between the multi-functional device 10 and the server 90 thereby. After that, all communication is performed via HTTP. The server 90 transmits a function execution instruction 314 including limitation information 316 which is linked with the user ID 312 to the multi-functional device 10. The multi-functional device 10 executes the PC print function according to the limitation information in the function execution instruction (S32). The multi-functional device 10 stores the print data in association with the session ID 310 in the work region 27.

When S32 is completed, the multi-functional device 10 transmits a polling signal 318 including the session ID 310 to the server 90. In response to the polling signal 318, the server 90 transmits a data transmission instruction 320 to the multi-functional device 10. The data transmission instruction 320 includes the session ID 310 included in the polling signal 318 and a URL 321 indicating a given folder inside the server 90. The multi-functional device 10 transmits print data 322, which is stored in the work region 27 in association with the session ID 310 in the data transmission instruction 320, to the URL 321 (that is server 90) in the data transmission instruction 320. After transmitting the print data 322, the multi-functional device 10 deletes the print data 322 from the storage unit 24. Further, the multi-functional device 10 transmits a completion notice 324, which includes result information 326 of the PC print function actually executed, to the server 90. As a result, the server 90 executes a modification process (S34), and then transmits a termination notice 328 to the multi-functional device 10.

(Other Processes Executed by the Multi-Functional Device 10 and the Server 60)

Figure 6:
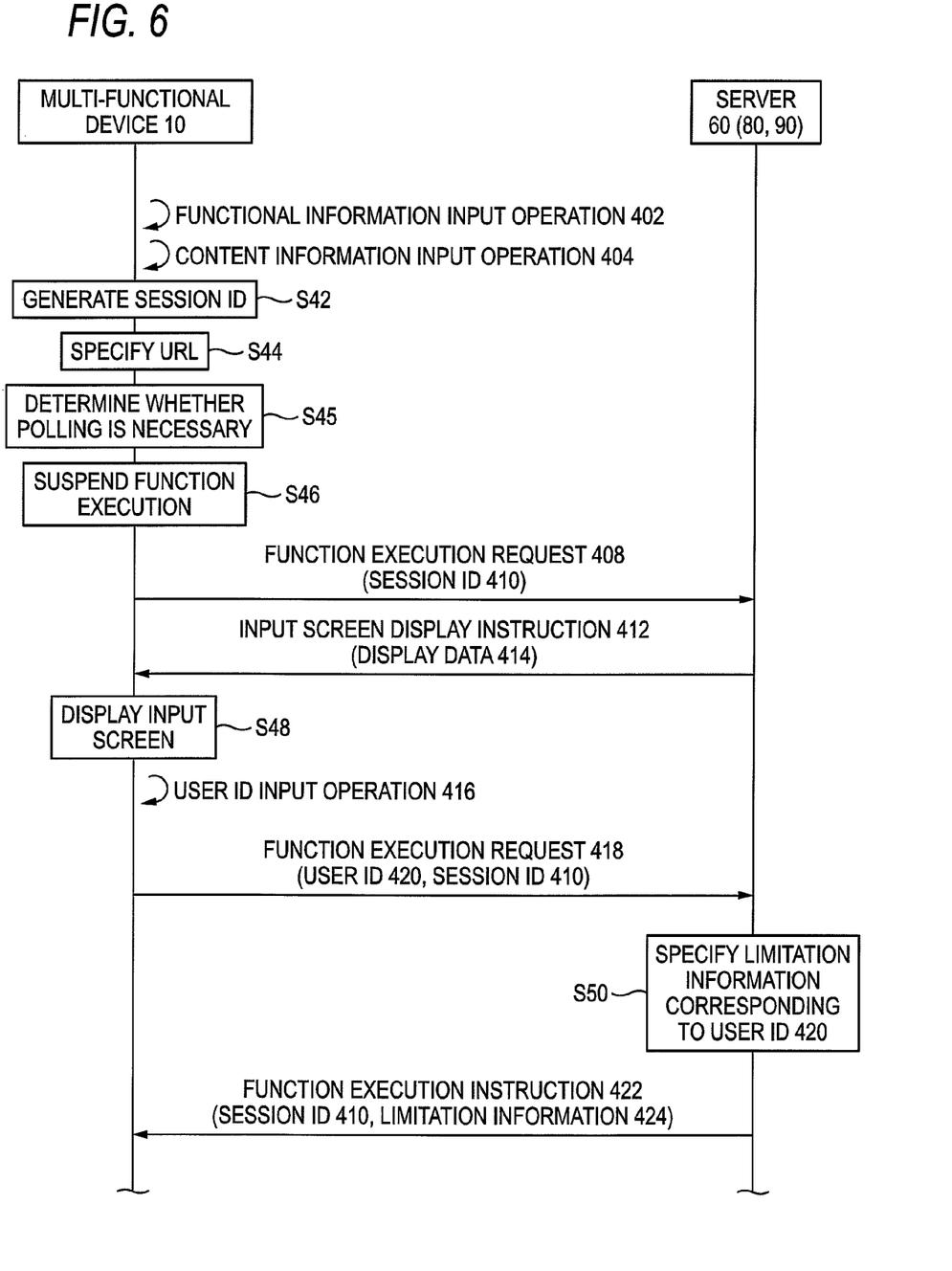
FIG. 6 shows another example of a process executed by a multi-functional device and a server.

Next, other processes executed by the multi-functional device 10 and the server 60 will be described with reference to FIG. 6. FIG. 6 illustrates the processes executed by the multi-functional device 10 and the server 60, and similar processes executed by the multi-functional device 10 and the servers 80 and 90. In FIG. 6, before a user performs the use ID input operation, a functional information input operation 402 and a content information input operation 404 are performed by the user. In this case, similar to the examples of FIGS. 4 and 5, the multi-functional device 10 generates a session ID (S42), specifies a URL 112 of the server 60 (S44), determines whether the polling of the server 60 is necessary (S45), and suspends the function execution (S46). The multi-functional device 10 transmits a function execution request 408, which includes the session ID 410 generated in S42 and does not include the user ID, to the server 60. Therefore, a communication session is established between the multi-functional device 10 and the server 60. After that all communication is performed via HTTP.

When the function execution request 408 that does not include the user ID is received, the server 60 transmits an input screen display instruction 412 to the multi-functional device 10. The input screen display instruction 412 includes display data 414 for displaying the user ID input screen. The multi-functional device 10 displays the user ID input screen on the display unit 14 according to the display data 414 (S48). The user inputs his/her user ID on the user ID input screen by operating the operating unit 12 (see Symbol 416). After the user ID has been input, the multi-functional device 10 transmits a function execution request 418 including a user ID 420 to the server 60.

Similar to S8 of FIG. 4, the server 60 specifies the limitation information including the user ID 420 (S50), and transmits a function execution instruction 422 including limitation information 424 to the multi-functional device 10. The subsequent processes of the multi-functional device 10 and the server 60 are similar to the processes subsequent to S12 in FIG. 4.

(Detailed Information of Processes Executed by the Multi-Functional Device 10)

Processes executed by the control unit 30 of the multi-functional device 10 will be described in detail with reference to FIGS. 7 and 8. The processes of FIGS. 4-6 are realized by executing the processes of FIGS. 7 and 8. When the power of the multi-functional device 10 is turned ON, a first obtaining unit 34 (see FIG. 1) monitors the input of the user ID (S102). When the user ID is input by the user by operating the operating unit 12 (see Symbol 200 of FIG. 4), the first obtaining unit 34 determines YES in S102. In addition, when the print instruction including the user ID is input (see Symbol 300 of FIG. 5), the first obtaining unit 34 determines YES in S102.

When S102 is YES, the first obtaining unit 34 stores the user ID that has been input in the work region 27 of the storage unit 24 (S104).

In addition, a second obtaining unit 36 (see FIG. 1) monitors the input of the functional information indicating the functions desired by the user (S110). When the functional information is input by the user by operating the operating unit 12 (see Symbol 202 of FIG. 4), the second obtaining unit 36 determines that YES in S110. In addition, when the print instruction indicating the PC print function has been received (see Symbol 300 of FIG. 5), the second obtaining unit 36 determines YES in S110. When S110 is YES, the control unit 30 monitors the input of the content information, which indicates the concrete content of the functional information input in S110 (S112). When the content information is input by the user by operating the operating unit 12 (see Symbol 204 of FIG. 4), the control unit 30 determines YES in S112. Further, when the print instruction including the content information has been received (see Symbol 300 of FIG. 5), the control unit 30 determines YES in S112. When S112 is YES, the control unit 30 generates a session ID (S114). After that, the control unit 30 stores the session ID generated in S114 in the work region 27.

Next, a specifying unit 38 (see FIG. 1) specifies the combination information which is linked with the functional information input in S110 and obtained from the functional management table 28 (see FIG. 2) (S116). For example, when the functional information input in S110 was "Copy" function, the specifying unit 38 specifies the combination information 100 which is linked with "Copy" and obtained from the functional management table 28. Next, the specifying unit 38 determines whether the server URL is in the combination information specified by S116 (hereinafter called "specified combination information") (S118). For example, when the specified combination information was the combination information 100 of FIG. 2, the specifying unit 38 determines YES in S118. Meanwhile, when the specified combination information was the combination information 108 of FIG. 2, the specifying unit 38 determines NO in S118.

When S118 is YES, the specifying unit 38 specifies the URL in the specified combination information (S120). Next, the control unit 30 determines whether it is necessary for the server corresponding to the URL specified in S120 (hereinafter called "specified server" to transmit the polling signal (S122). Specifically, when the polling necessity information 114 in the specified combination information is YES, the control unit 30 determines YES in S122. Meanwhile, when the polling necessity information 114 in the specified combination information is NO, the control unit 30 determines NO in S122. When S122 is YES, a second transmission unit 42 (see FIG. 1) decides to transmit a polling signal, which includes the session ID generated in S114, to the specified server (S124). As a result, at a predetermined interval, the second transmission unit 42 transmits polling signals to the specified server. After S124 terminates, processing proceeds to S126. Meanwhile, when S122 is NO, S124 is skipped and processing proceeds to S126.

In S126, the function execution unit 32 (see FIG. 1) suspends the function execution indicated by the functional information input in S110. Next, a first transmission unit 40 transmits the function execution request to the specified server (S130). When S130 is executed and the user ID is stored in the work region 27 of the storage unit 24, the function execution request includes the session ID generated in S114 and the user ID. When the user ID is not stored in the work region 27 of the storage unit 24, the function execution request includes the session ID, and does not include the user ID. When the function execution request including the session ID has been transmitted to the specified server, the communication session is established between the multi-functional device 10 and the specified server.

When S118 is NO, the function execution unit 32 does not suspend the function execution indicated by the functional information input in S110, but executes the function (S132). For example, when the functional information input in S110 is "USB direct print", NO is determined in S118 (see the combination information 106 of FIG. 2). In this case, the function execution unit 32 uses the data in the USB memory connected to the USB interface 22 to execute printing according to the content information (print number and sheet size, etc.) input in S112.

Figure 7:
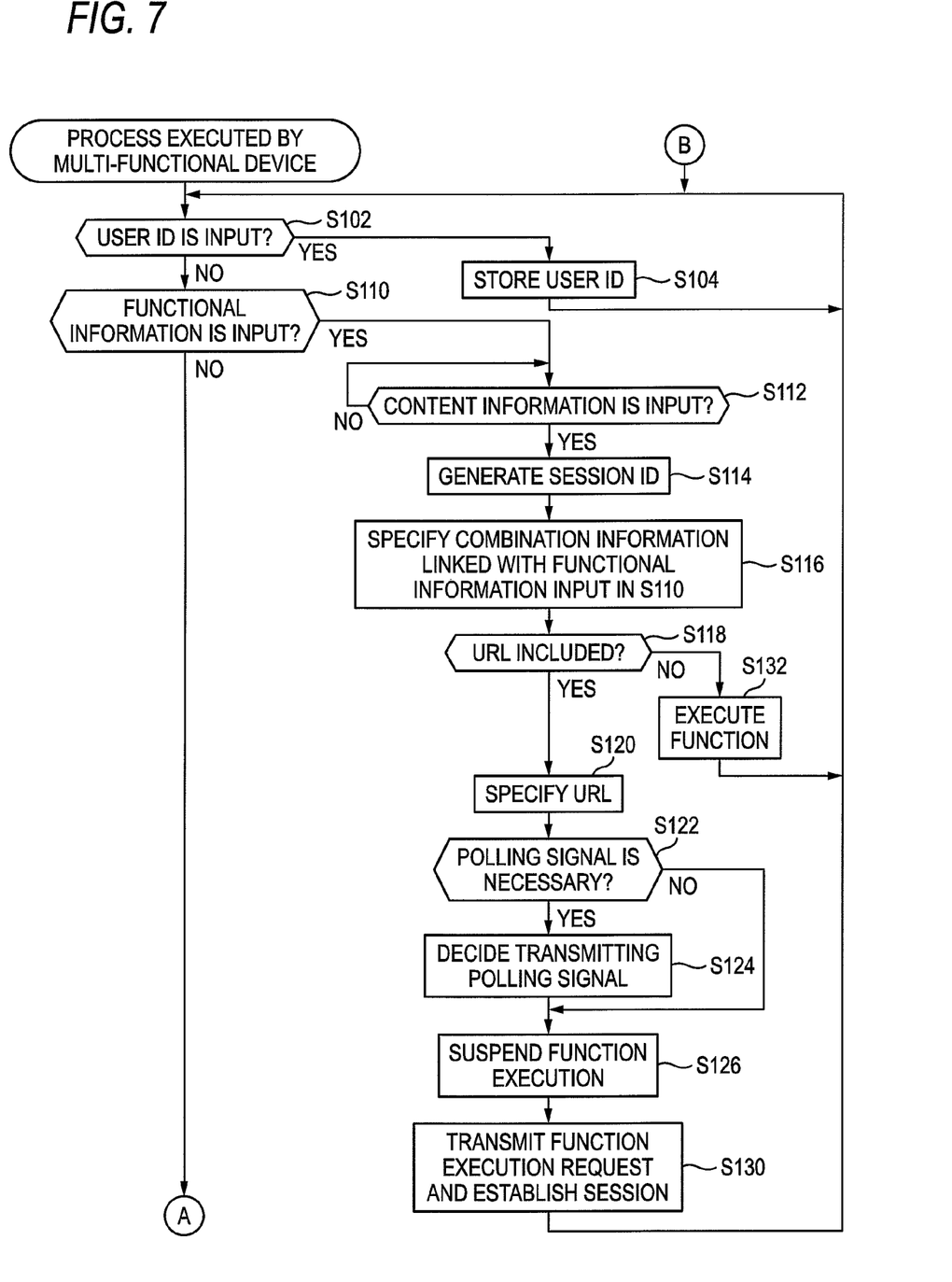
FIG. 7 shows a flowchart of processing of a multi-functional device.
Figure 8:
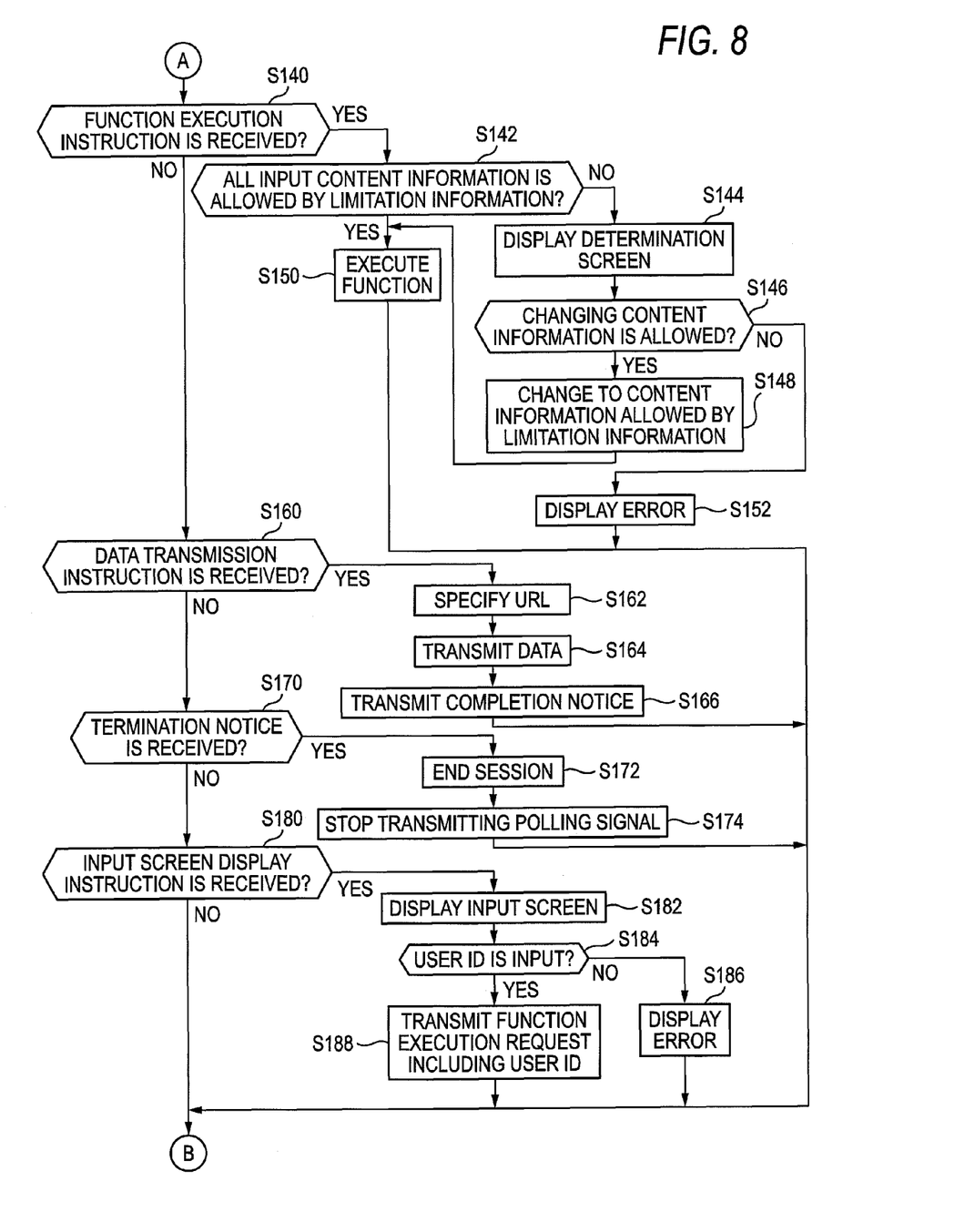
FIG. 8 shows a successive flowchart of FIG. 7.

In addition, as shown in FIG. 8, a first reception unit 46 (see FIG. 1) monitors whether the multi-functional device 10 received the function execution instruction (Symbol 214 of FIG. 4, Symbol 314 of FIG. 5 and Symbol 418 of FIG. 6) from the specified server (S140). When S140 is YES, the function execution unit 32 determines whether all the content information input in S112 of FIG. 7 is allowed by the limitation information included in the function execution instruction (S142). When S142 is YES, the function execution unit 32 resumes the function suspended in S126 of FIG. 7 according to the content information input in S112 of FIG. 7.

When S142 is NO, the control unit 30 displays determination screen on the display unit 14. The determination screen includes a character string indicating that some of the content information input by the user is not allowed by the limitation information. The determination screen allows the user to determine whether the content information input by the user is to be changed to new content information allowed by the limitation information. For example, when the content information input by the user is "Color copy" and the limitation information is "Monochrome OK, color NG", the control unit 30 displays the determination screen for the user to request whether the "Color copy" can be changed to "Monochrome copy" in S144. Meanwhile, for PC print, the control unit 30 may display the determination screen on the display unit which is in the external device of the print instruction source. The control unit 30 determines whether changing the content information is allowed by the user (S146). When changing the content information is allowed by the user on the determination screen, the control unit 30 determines YES in S146. When changing the content information is not allowed by the user on the determination screen, the control unit 30 determines NO in S146. In this case, the control unit 30 displays an error screen on the display unit 14 (S152). Meanwhile, for the PC print, the control unit 30 may display the error screen on the display unit which is in the external device of the print instruction source.

When S146 is YES, the control unit 30 changes the content information input by S112 of FIG. 7 to the new content information which is allowed by the limitation information (S148). For example, the control unit 30 changes "Color copy" to "Monochrome copy". Next, the function execution unit 32 resumes the function suspended in S122 of FIG. 7 according to the new content information (S150). Further, the control unit 30 stores various data (such as scan data and print data used for executing the function, hereinafter called "specific data") in the work region 27 in association with the session ID generated by S114 of FIG. 7.

In addition, the second reception unit 48 monitors whether the multi-functional device 10 receives the data transmission instruction (Symbol 218 of FIG. 4 and Symbol 320 of FIG. 5) from the specific server (S160). When S160 is YES, the control unit 30 specifies the URL in the data transmission instruction (S162). Subsequently, a third transmission unit 44 (see FIG. 1) transmits the specific data, which is stored in the work region 27 in association with the session ID in the data transmission instruction, to the URL specified in S162 (S164). Next, the control unit 30 transmits the completion notice, which includes the session ID generated in S114 of FIG. 7, the user ID stored in S104 of FIG. 7 and the result information indicating the functional content actually executed in S150, to the specific server (S166).

Further, the control unit 30 monitors whether the multi-functional device 10 received the termination notice (see Symbol 226 of FIG. 4 and Symbol 328 of FIG. 5) from the specific server (S170). When S170 is YES, the control unit 30 transmits a signal to the specific server to end the session established in S128 of FIG. 7 (S172). Subsequently, the second transmission unit 42 stops transmitting polling signals to the specific server (S174).

In addition, the third reception unit 50 (see FIG. 1) monitors whether the multi-functional device 10 received the input screen display instruction (see Symbol 412 of FIG. 6) from the specific server. When S180 is YES, a display control unit 52 (see FIG. 1) displays the input screen on the display unit 14 of the multi-functional device 10 according to the display data in the input screen display instruction (S182). Next, the first obtaining unit 34 determines whether the user ID is input into the input screen (S184). When S184 is YES, the first transmission unit 40 transmits the function execution request including the user ID input in S184 to the specific server (S188). In addition, the first obtaining unit 34 stores the user ID input in S184 in the work region 27. When S184 is NO, the control unit 30 displays an error screen on the display unit 14 of the multi-functional device 10 (S186). Meanwhile, for the PC print, the control unit 30 may display the input screen and the error screen on the display unit which is in the external device of the print instruction source.

An exemplary embodiment of the present invention has been described in detail. In the present embodiment, each of the plurality of servers 60, 80 and 90 stores the limitation information for each user, where the plurality of servers respectively correspond to the plurality of functions executable by the multi-functional device 10. Because the multi-functional device 10 does not store the limitation information for each user, the amount of the information in the storage unit 24 of the multi-functional unit 10 can be small. Further, in the present embodiment, as shown in FIGS. 4 and 5, the multi-functional device 10 can receive the limitation information corresponding to the user by transmitting the user ID of the user desiring to execute the copy function, etc. to the server 60 corresponding to the copy function, etc. The multi-functional device 10 can execute the copy function according to the limitation information that has been received. That is, in the embodiment, by using the plurality of servers 60, 80 and 90 the function execution for each user can be limited. The function execution system 2 which can not be realized by related-art models can be constructed by such new model. For example, a business model utilizing the servers 60, 80 and 90 limiting the function execution for each user may be constructed. When each of the plurality of servers 60, 80 and 90 is utilized respectively, what is also fully considered is the possibility that the user interfaces provided to the users are different when each of the functions of each server is executed. In the embodiment, when the functional information indicating the function desired by the user has been input into the multi-functional device 10, the multi-functional device 10 can transmit the function execution request to the server corresponding to that function. Because of this, the user can input the information of the function desired to be executed and the content information into the multi-functional device 10 with the user interface of the multi-functional device 10, without using the user interface of the server. Therefore, the user can input various information with the same user interface of the multi-functional device 10, irrespective of the function that is desired to be executed.

Further, as shown in S132 of FIG. 7, when the URL of the server from the functional management table 28 is not specified (when S118 is NO), the multi-functional device 10 does not suspend the function execution, but executes the function desired by the user. Thus, the problem that a user may feel unpleasant when the function desired by the user is not executed can be prevented.

Further, the multi-functional device 10 executes the monochrome copy function, when the user desires the color copy function (or color transmission function, color print function) to be executed but the function execution instruction, which includes the limitation information indicating that color copy function is forbidden from executing and monochrome copy function is allowed to be executed, is received. The problem that a user may feel unpleasant when the copy function desired by the user is not executed at all can be prevented.

Further, the multi-functional device 10 transmits the polling signal to the server 90 located outside the LAN 9. Therefore, in response to the polling signal, the server 90 can transmit the data transmission instruction 320 (see FIG. 5) to the multi-functional device 10. As a result, the multi-functional device 10 can transmit the scan data and the print data to the URL of the data storage server in the data transmission instruction located outside the LAN 9. Meanwhile, the multi-functional device 10 does not transmit the polling signal to the servers 60 and 80 located inside the LAN 9. Therefore, even without responding to the polling signal, multi-functional device 10 can immediately receive the data transmission instruction (see FIG. 4) from the servers 60 and 80. Further, the amount of the communication data in the LAN 9 can be reduced.

The multi-functional device 10 transmits the function execution request 408 without the user ID (see FIG. 6) to the server 60 when the functional information indicating the function desired by the user has been input before the user ID is input. In this case, the multi-functional device 10 displays the input screen on the display unit 14 according to the input screen display instruction transmitted from the server 60. The multi-functional device 10 can obtain the user ID input by the user on the input screen.

Variations of the above-described exemplary embodiment are listed below.

(1) In the above above-described embodiments, each of the plurality of servers 60, 80 and 90 corresponding to the plurality of functions is configured separately. However, the plurality of servers corresponding to the plurality of functions may be configured in one device. Even in this case, it can be said that the function execution system includes "a plurality pf servers".

(2) The LAN 9 may be configured not by the wire communication cable 4. Further, the LAN 9 may be configured in a wireless way.

(3) The execution function 130b and 140b of the limitation information 130 and 140 of FIG. 3 shows both the functions that can be executed and the functions that cannot be executed by the user, like [Monochrome OK, color NG]. However, the execution function 130b and 140b may only show the functions that can be executed for the user, like [Monochrome OK]. In this case, the limitation information 216 and 316 (see FIGS. 4 and 5) may include the functions that can be executed but not include the functions that cannot be executed. In addition, the execution function 130b and 140b may only show the functions that cannot be executed, like [Color NG]. In this case, the limitation information 216 and 316 (see FIGS. 4 and 5) may include the functions that cannot be executed but not include the functions that can be executed.

(4) The function execution request 208 and 308 (FIGS. 4 and 5) may include the session ID 210 and 310, the user ID 212 and 312, and the content information input by the user. In this case, the servers 60 and 90 can determine whether all the content information in the function execution request 208 and 308 can be allowed by the limitation information corresponding to the user ID 212 and 312. The limitation information 216 and 316 included in the function execution instruction 214 and 314 transmitted to the multi-functional device 10 by the servers 60 and 80 may be execution allowance information indicating whether the function according to the content information input by the user can be allowed to execute or not.

(5) In the functional management table 28 of FIG. 2, the polling necessity information 114 is stored by being linked with the functional information 110 and the URL 112. However, for example, an IP address can be stored as the location information of the server, and whether the server is located inside the LAN 9 or outside the LAN 9 can be determined by matching a network prefix of an IP address of the server with a network prefix of an IP address of the multi-functional device itself. The polling signal can be transmitted to the server outside the LAN 9 based on the determination.

(6) In the above-described embodiments, the data storage servers that serve as the data transmission destinations (see FIGS. 4 and 5) for the data transmitted according to the data transmission instruction 218 and 320 are the servers 60 and 90. However, the data storage server may be different from the server 60 and 90.

(7) In the above-described embodiments, the input screen display instruction 412 (see FIG. 6) includes the display data to display the input screen. However, the input screen display instruction 412 may not include the display data. The display data may be stored in the storage unit 24 of the multi-functional device 10. In this case, according to the input screen display instruction from the server 60, the multi-functional device 10 can display the input screen on the display unit 14 according to the display data stored in the storage unit 24.

The exemplary embodiments of the invention have been described above. However, the scope of claims may not be restricted by the above-described exemplary embodiments. The technology described in the claim also includes variations and modifications of the above-described exemplary embodiments.

In addition, technical elements explained in the description and the drawings can be used independently or in combination so as to achieve technical utility, and is not restricted by the combination recited in the claims. In addition, a plurality of purposes can be achieved at the same time by the technology described in the description and the drawings, and by achieving one of the plurality of purposes, technical utility can be achieved.

In the above-described embodiments, functions of the units are implemented by software. However, the functions of the units, or at least a part of thereof, may be implemented by hardware.

The invention claimed is:

1. A multi-functional device communicatably connected to a plurality of servers, each server corresponding to one of a plurality of functions, comprising:
a function execution unit that executes one of the plurality of functions;
a storage unit that stores a function management table in which each function identification information indicative of each of the plurality of functions and each of a plurality of location information of each server corresponding to each of the plurality of functions are linked with each other, respectively;
a first obtaining unit that obtains user identification information indicative of a user;
a second obtaining unit that obtains the function identification information indicative of a desired function to be executed, when the user carries out an operation to request the desired function to be executed;
a third obtaining unit that obtains content information indicating a specific content of the desired function;
a specifying unit that specifies the location information of the server linked with the obtained function identification information from the plurality of location information stored in the storage unit;
a first transmission unit that transmits a first signal including the obtained user identification information based on the specified location information of the server;
a first reception unit that receives a function execution instruction, which is transmitted from the server in response to the first signal including the obtained user identification information, the function execution instruction including limitation information which corresponds to the user and which limits execution of the desired function; and
a first determination unit that determines whether of the content information obtained by the third obtaining unit is allowed by the limitation information included in the function execution instruction.

2. The multi-functional device according to claim 1, wherein the function execution unit is capable of executing the desired function both in color and in monochrome, and
wherein the function execution unit executes the desired function in monochrome, when execution of the desired function in color is requested by the user, but the function execution unit receives the function execution instruction that includes the limitation information, which indicates that execution of the desired function in color is forbidden and only execution of the desired function in monochrome is allowed.

3. The multi-functional device according to claim 1, further comprising a second transmission unit that transmits a second signal to the location of the server when the server is located outside of a local area network of the multi-functional device and the location information of the server is specified.

4. The multi-functional device according to claim 3, wherein the second signal is a polling signal which requests the server to transmit a response.

5. The multi-functional device according to claim 3, wherein the second transmission unit does not transmit the second signal to the location of the server when the server is located inside of the local area network of the multi-functional device and the location information of the server is specified.

6. The multi-functional device according to claim 1, further comprising a third reception unit and a display control unit,
wherein, when the function identification information is obtained before the user identification information is obtained, the first transmission unit transmits a third signal that does not contain the user identification information based on the location information of the server,
wherein, in response to the third signal that does not contain the user identification information, the third reception unit receives a display instruction transmitted from the server to display an input screen for inputting the user identification information, wherein the display control unit displays the input screen on a display unit according to the display instruction, and wherein the first obtaining unit obtains the user identification information input into the input screen by the user and the first transmission unit transmits the first signal including the obtained user identification information.

7. The multi-functional device according to claim 1,
wherein the function execution unit suspends the execution of the desired function when the location information of the server is specified, and wherein when the function execution instruction is received, the function execution unit resumes execution of the desired function, which was suspended according to the limitation information included in the function execution instruction.

8. The multi-functional device according to claim 7,
wherein when the location information of the server is not specified, the function execution unit executes the desired function and does not suspend the execution of the desired function.

9. The multi-functional device according to claim 7, further comprising a second transmission unit that transmits a second signal to the location of the server when the server is located outside of a local area network of the multi-functional device and the location information of the server is specified, a second reception unit and a third transmission unit, wherein, when the function execution instruction is received, the function execution unit resumes execution of the desired function, which was suspended, using data according to the limitation information included in the function execution instruction, wherein, in response to the second signal, the second reception unit receives a data transmission instruction that is transmitted from the server and includes location information of a data storage server, and wherein, when the data transmission instruction is received, the third transmission unit transmits the data based on the location information of the data storage server that is included in the data transmission instruction.

10. The multi-functional device according to claim 1, wherein the plurality of functions include at least copy and facsimile transmission.

11. A non-transitory computer readable recording medium storing a computer program for a multi-functional device communicatably connected to a plurality of servers, each server corresponding to one of a plurality of functions, the computer program causing the multi-functional device to perform the method of:

executing one of the plurality of functions;

storing a function management table in which each function identification information indicative of each of the plurality of functions and each location information of each server corresponding to each of the plurality of functions are linked with each other, respectively;

obtaining user identification information indicative of a user;

obtaining the function identification information indicative of a desired function to be executed, when the user carries out an operation to request the desired function to be executed;

obtaining content information indicating a specific content of the desired function;

specifying the location information of the server linked with the obtained function identification information;

transmitting a first signal including the obtained user identification information based on the location of the server;

receiving a function execution instruction, which is transmitted from the server in response to the first signal including the obtained user identification information, and the function execution instruction including limitation information which corresponds to the user and which limits execution of the desired function; and determining whether all of the obtained content information is allowed by the limitation information included in the function execution instruction.

12. The non-transitory computer readable recording medium according to claim 11, wherein, when the location information of the server is specified, the execution of the desired function is suspended, and wherein, when the function execution instruction is received, execution of the desired function, which was suspended, is resumed according to the specific limitation information included in the function execution instruction.

13. The non-transitory computer readable recording medium according to claim 11, wherein the plurality of functions include at least copy and facsimile transmission.

14. A system comprising:

a plurality of servers, each corresponding to one of a plurality of functions including a first function and a second function different from the first function, the plurality of servers including, a first server corresponding to the first function, the first server storing a first limitation information table including first limitation information, which limits execution of the first function, for each user, and a second server corresponding to the second function, the second server storing a second limitation information table including second limitation information, which limits execution of the second function, for each user; and a multi-functional device communicatably connected to the plurality of servers, the multi-functional device including:

a function execution unit that executes one of the plurality of functions;

a storage unit that stores, for each of the plurality of functions, function identification information indicative of the function and location information of the server corresponding to the function, such that the function identification information and the location information of the server are linked with each other;

a first obtaining unit that obtains user identification information indicative of a user;

a second obtaining unit that obtains the function identification information indicative of a desired function to be executed, when the user carries out an operation to request the desired function to be executed;

a specifying unit that specifies the location information of the server linked with the function identification information from the storage unit;

a first transmission unit that transmits a first signal including the obtained user identification information to the server based on the location information of the server; and a first reception unit that receives a function execution instruction that is transmitted from the server in response to the first signal including the obtained user identification information, wherein the function execution instruction includes a limitation information which corresponds to the user and which limits execution of the desired function, wherein, when the second obtaining unit obtains a first function identification information indicative of the first function, the specifying unit specifies a first location information of the first server linked with the first function identification information from the storage unit, the first transmission unit transmits the first signal including the obtained user identification information to the first server based on the first location information of the first server, and the first reception unit receives a function execution instruction including the first limitation information, which is transmitted from the first server in response to the first signal, and wherein, when the second obtaining unit obtains a second function identification information indicative of the second function, the specifying unit specifies a second location information of the second server linked with the second function identification information from the storage unit, the second location information being different from the first location information, the first transmission unit transmits the first signal including the obtained user identification information to the second server based on the second location information of the second server, and the first reception unit receives a function execution instruction including the second limitation information, which is transmitted from the second server in response to the first signal.

15. The system according to claim 14, wherein the plurality of functions include at least copy and facsimile transmission.

* * * * *